H. LINES,

Landau-Carriage Top.

No. 9,117. Reissued Mar. 16, 1880.

Attest:
Courtney A. Cooper
William Parsons.

Inventor:
Henry Lines
By his attorney
Charles E. Foster

N. PETERS, PHOTO-LITHOGRAPHER, WASHINGTON, D. C.

UNITED STATES PATENT OFFICE.

HENRY LINES, OF NEW HAVEN, CONNECTICUT.

LANDAU-CARRIAGE TOP.

SPECIFICATION forming part of Reissued Letters Patent No. 9,117, dated March 16, 1880.

Original No. 174,372, dated March 7, 1876. Application for reissue filed January 19, 1880.

*To all whom it may concern:*

Be it known that I, HENRY LINES, of the city of New Haven, county of New Haven, State of Connecticut, have invented an Improvement in Carriage-Tops, of which the following is a specification.

The object of this invention is to prevent the sudden folding and to facilitate the raising of the falling hood of a vehicle; and it consists in the combination, with such portion, of certain spring appliances, substantially as described hereinafter, whereby the result is effected.

Figure 1:
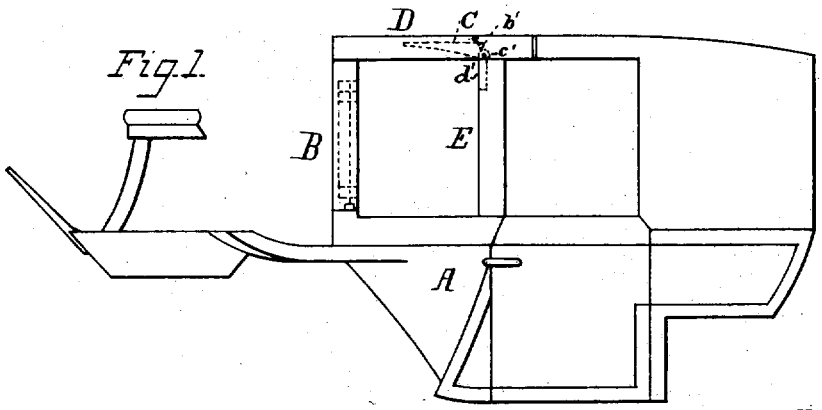
Figure 2:
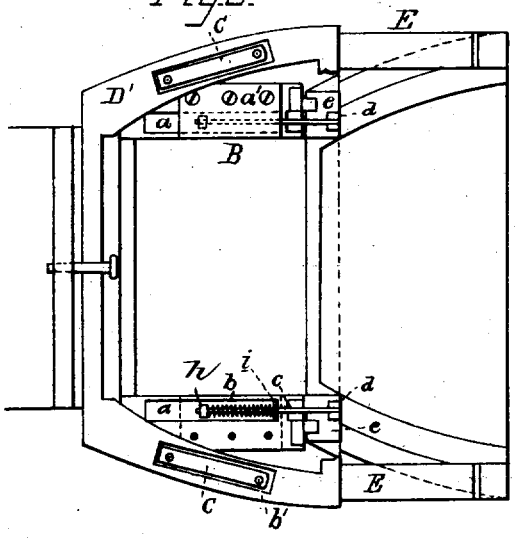
Figure 3:
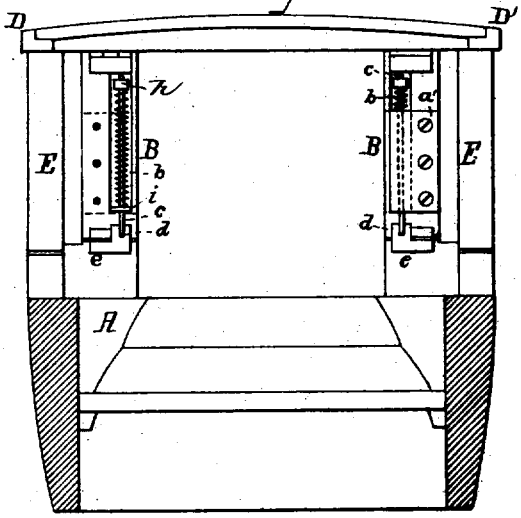
Figure 4:
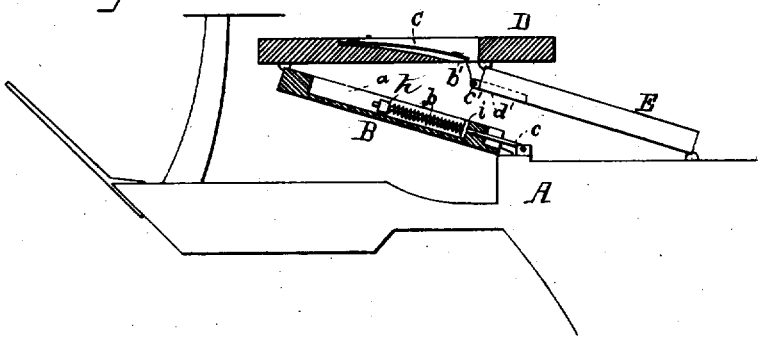

In the drawings forming part of this specification, Figure 1 is a side elevation with the top closed, showing by dotted lines the position of the springs. Fig. 2 is a top view with the front hood folded down, showing the springs and connecting-rods. Fig. 3 is a transverse section, showing the inner face of the front pillars, with the springs and rods adjusted in recesses in the pillars. Fig. 4 is a side view of the front part of the top folded down, with the side of front pillar and top rail broken off, showing the position of the springs and rods.

A is the body of a landau-carriage, having glass windows in the front and sides of the front portion or hood, which constitutes the falling cover, and the depression of which uncovers the seat.

B represents the front pillars of the top, which pillars are provided with recesses *a a*, in which spiral springs *b b* are adjusted on rods *c c*, the upper ends of the latter being threaded to receive heads or nuts *h*, bearing on the upper ends of the spiral springs, and the lower ends of rods are pivoted to lugs *d* on the hinges *e*, connecting the pillars with the body of the carriage. The lower end of each spring *b* bears on a lug, *i*, attached to the falling top, through which lug the rod *c* slides. These springs and rods are covered in the recesses in the pillars by plates *a'*, so that they occupy no space in the carriage, and are entirely out of the way.

C, Figs. 1, 2, and 4, is a flat steel spring, secured in a recess in the top rail, D, of the front hood, and is connected by a link, *b'*, to a lug, *c'*, on a plate, *d'*, secured to the upper part of the front door-post, E.

In constructing the tops to be operated by the flat springs, each top rail, D and D', is provided with a similar spring. The spiral springs are contracted and the flat spring bent downward when the top is folded down, as shown in Fig. 4, in which position the force of the springs tends to prevent the top from falling suddenly and injuring the parts or breaking the glass, and aids in raising the top to its upright position.

Either the spiral springs or the flat springs may be used alone, or, to secure greater force, both kinds may be employed, as shown, and the lugs *d d* may be separate from the hinges.

What I claim as new, and desire to secure by Letters Patent, in a folding-top carriage or vehicle, is—

1. The combination, with the folding-top portion of a vehicle, of rods *c c*, pivoted to the body of the carriage, and spiral springs *b*, interposed between heads or nuts *h* on the rods and lugs *i* on the falling top, substantially as set forth.

2. The spiral springs *b*, having their bearings at one end on the falling hood, in combination with rods *c*, hinged or pivoted to the body of the carriage, and extending through and bearing on the ends of said springs, substantially as and for the purposes described.

3. The combination of the post E, top D, jointed to one edge of the post, flat spring C, carried by the top, and link *b'*, connecting the end of the spring to a lug, *c'*, on the end of the post, all as set forth.

In testimony whereof I have signed my name to this specification in the presence of two subscribing witnesses.

HENRY LINES.

Witnesses:
D. B. WILMOT,
JOHN R. DUNN.